United States Patent [19]

Kishida et al.

[11] Patent Number: 4,556,692

[45] Date of Patent: Dec. 3, 1985

[54] THERMOPLASTIC RESIN COMPOSITION HAVING EXCELLENT IMPACT RESISTANCE AND HEAT RESISTANCE

[75] Inventors: Kazuo Kishida; Naoki Yamamoto, both of Hiroshima; Yasumasa Sato, Tokorozawa, all of Japan

[73] Assignee: Mitsubishi Rayon Co., Ltd., Tokyo, Japan

[21] Appl. No.: 676,810

[22] Filed: Nov. 30, 1984

[30] Foreign Application Priority Data

Dec. 1, 1983 [JP] Japan ................................. 58-227537
Dec. 2, 1983 [JP] Japan ................................. 58-227845

[51] Int. Cl.$^4$ ........................................... C08F 265/02
[52] U.S. Cl. ..................................... 525/78; 525/301
[58] Field of Search ................................. 525/78, 301

[56] References Cited

U.S. PATENT DOCUMENTS 4,331,784   5/1982   Ishibashi .............................. 525/301

Primary Examiner—Paul R. Michl
Attorney, Agent, or Firm—Oblon, Fisher, Spivak, McClelland & Maier

[57] ABSTRACT

A thermoplastic resin composition having excellent impact resistance and heat resistance which comprises 5 to 95% by weight of a graft copolymer (I) obtained by polymerizing 93 to 30 parts by weight of a monomer or a monomer mixture for grafting comprising 30 to 100% by weight of at least one monomer selected from the group consisting of styrene, α-methylstyrene, acrylonitrile and methyl methacrylate and 0 to 70% by weight of at least one copolymerizable monomer having $CH_2=C<$ group in the presence of 7 to 70 parts by weight (in terms of solid) of a rubber latex of agglomerated particles having a particle diameter of at least 0.2 μm obtained by adding 0.1 to 5 parts by weight (in terms of solid) of an acid-group containing copolymer (B) latex obtained from 3 to 30% by weight of an acid-group containing monomer, 97 to 35% by weight of at least one alkyl acrylate having 1 to 12 carbon atoms in the alkyl group, and 0 to 48% by weight of at least one monovinyl monomer copolymerizable therewith (100% by weight in total) to 100 parts by weight (in terms of solid) of a rubber (A) latex of small particle size having a pH of 7 or above obtained from 100 to 50% by weight of 1,3-butadiene and 0 to 50% by weight of other copolymerizable monomer having $CH_2=C<$ group (100% by weight in total); 95 to 5% by weight of a thermoplastic resin (II) obtained by polymerizing α-methylstyrene and at least one other copolymerizable monomer having $CH_2=C<$ group; and 0 to 50% by weight of other thermoplastic resin (III) containing no α-methylstyrene unit, said components (I), (II) and (III) being compounded so as to give a content of said butadiene rubber (A) in the whole composition of 3 to 40% by weight and a content of α-methylstyrene unit in the whole composition of 10 to 75% by weight.

13 Claims, No Drawings

THERMOPLASTIC RESIN COMPOSITION HAVING EXCELLENT IMPACT RESISTANCE AND HEAT RESISTANCE

TECHNICAL FIELD

This invention relates to a novel thermoplastic resin composition having excellent impact resistance and heat resistance.

PRIOR ART

As thermoplastic resin having excellent impact resistance, there are widely used as present rubber-modified thermoplastic resins, of which ABS resins and high impact polystyrenes are typical representatives. However, the use thereof at relatively high temperatures has been subjected to restrictions due to their poor heat resistance. As a result, there have been proposed various methods for improving the heat resistance of ABS resins. For example, there is disclosed in Japanese Patent Publication Nos. 18194/60 and 33661/70 and other publications that compositions having high heat resistance can be obtained by blending a copolymer formed of α-methylstyrene and acrylonitrile with ABS resin or by introducing α-methylstyrene into ABS resin polymer. However, when an α-alkylaromatic vinyl monomer is introduced as a unit of graft polymer or blend plymer, though the heat resistance of the resultant resin is improved with the increase in the amount of the introduced monomer, the impact resistance of the resin is deteriorated markedly. So that it has been difficult to obtain a rubber-modified thermoplastic resin having simultaneously excellent impact strength and heat resistance by such means.

The present inventors made extensive studies to solve the problem mentioned above. As a result, it has been found out that a thermoplastic resin composition having excellent impact resistance and high heat resistance can be obtained by compounding a graft copolymer (I) obtained from an agglomerated rubber obtained by agglomerating the particles of a diene rubber obtained by conventional emulsion polymerization by treating with a copolymer latex obtained principally from unsaturated acid monomer and alkyl acrylate; a thermoplastic resin (II) having α-methylstyrene as the essential constituent; and, optionally, other thermoplastic resin (III) containing no α-methylstyrene unit in such a way that the proportions of the butadiene rubber (A) and the α-methylstyrene unit may respectively fall within a specified range. This invention has been accomplished on the basis of above finding.

OBJECT OF THE INVENTION

The object of this invention is to provide a thermoplastic resin composition which is excellent in both impact resistance and heat resistance.

CONSTITUTION OF THE INVENTION

This invention relates to a thermoplastic resin composition having excellent impact resistance and heat resistance which comprises 5 to 95% by weight of a graft copolymer (I) obtained by polymerizing 93 to 30 parts by weight of a monomer or a monomer mixture for grafting comprising 30 to 100% by weight of at least one monomer selected from the group consisting of styrene, α-methylstyrene, acrylonitrile and methyl methacrylate and 0 to 70% by weight of at least one copolymerizable monomer having $CH_2=C<$ group in the presence of 7 to 70 parts by weight (in terms of solid) of a rubber latex of agglomerated particles having a particle diameter of at least 0.2 μm obtained by adding 0.1 to 5 parts by weight (in terms of solid) of an acid-group containing copolymer (B) latex obtained from 3 to 30% by weight of an acid-group containing monomer, 97 to 35% by weight of at least one alkyl acrylate having 1 to 12 carbon atoms in the alkyl group, and 0 to 48% by weight of at least one monovinyl monomer copolymerizable therewith (100% by weight in total) to 100 parts by weight (in terms of solid) of a rubber (A) latex of small particle size having a pH of 7 or above obtained from 100 to 50% by weight of 1,3-butadiene and 0 to 50% by weight of other copolymerizable monomer having $CH_2=C<$ group (100% by weight in total); 95 to 5% by weight of a thermoplastic resin (II) obtained by polymerizing α-methylstyrene and at least one of other copolymerizable monomer having $CH_2=C<$ group; and 0 to 50% by weight of other thermoplastic resin (III) containing no α-methylstyrene unit, said components (I), (II) and (III) being compounded so as to give a content of said butadiene rubber (A) in the whole composition of 3 to 40% by weight and a content of α-methylstyrene unit in the whole composition of 10 to 75% by weight.

The rubber components (A) used in this invention are those which are constituted of 100 to 50% by weight of 1,3-butadiene and 0 to 50% by weight of other copolymerizable monomer having $CH_2=C<$ group (100% by weight in total) and are 1,3-polybutadiene or copolymers derived from 50% or more of 1,3-butadiene, which include, for example, butadiene-aromatic vinyl compound copolymers such as butadiene-styrene or butadiene-vinyltoluene copolymer, butadiene-acrylonitrile copolymer, butadiene-methacrylonitrile copolymer, butadiene-alkyl acrylate copolymers such as butadiene-methyl acrylate, butadiene-ethyl acrylate butadiene-butyl acrylate, and butadiene-2-ethylhexyl acrylate copolymer and butadiene-alkyl methacrylate copolymers such as butadiene-methyl methacrylate and butadiene-ethyl methacrylate copolymer, and further include terpolymers derived from 50% or more of butadiene. These polymers can be easily obtained by commonly known methods of emulsion polymerization. There is no particular restriction as to catalysts and emulsifiers to be used. The polymers have a particle diameter of 0.04 to 0.2 μm.

It is essential for the acid-group containing copolymer (B) used for agglomerating the particles of the synthetic rubber in this invention to be in the form of a latex and to be constituted of a specified acid-group containing monomer and alkyl acrylate. It is also possible to copolymerize, as required, other copolymerizable monovinyl monomer.

Examples of the acid-group containing monomer constituting the acid-group containing polymer include acrylic acid, methacrylic acid, itaconic acid and crotonic acid. These monomers may be used each alone or in a mixture thereof. The constituting proportion of said acid-group containing monomer in the acid-group containing copolymer is 3 to 30% by weight. At a proportion below 3% by weight the agglomerating ability of the copolymer is too low, whereas at a proportion over 30% by weight the agglomerating power is too strong and it tends to cause the formation of too large particles of over 1 μm.

As to the acid-group containing monomers or similar monomers, there may be mentioned besides those mentioned above, cinnamic acid, maleic anhydride, butene tricarboxylic acid and so forth; but these are not useful in practice because copolymers prepared by using the monomers exhibit poor agglomerating ability.

The alkyl acrylates having 1 to 12 carbon atoms in the alkyl group which constitute the acid-group containing copolymer are used each alone or in a mixture thereof. The satisfactory effect of this invention can be obtained when the proportion of the monomer is 97 to 35% by weight in the acid-group containing copolymer.

Suitable examples of other copolymerizable monovinyl monomers used for forming the acid-group containing copolymer (B) as required include aromatic vinyl compounds such as styrene, α-methylstyrene and vinyltoluene, vinyl cyanide compounds such as acrylonitrile and methacrylonitrile, and alkyl(meth)acrylates having 1 to 12 carbon atoms in the alkyl group. These monomers are used each alone or in a mixture thereof. The constituting proportion of the above-mentioned other copolymerizable monovinyl monomer in the acid-group containing copolymer (B) is 0 to 48% by weight. At a proportion exceeding 48% by weight the effect of this invention cannot be attained.

As to preferred examples of the acid-group containing copolymer (B), mention may be made of n-butyl acrylate-methacrylic acid copolymer.

In preparing the acid-group containing copolymer used in this invention, anionic surfactants are preferably used as an emulsifier, but nonionic surfactants may also be used.

The acid-group containing monomer, alkyl acrylate and copolymerizable monovinyl monomer may be added all at once, or they may be added in portions or continuously. Further, in portionwise or continuous addition, the composition of the mixtures of above-mentioned monomers may be changed stepwise. For example, an acid-group containing copolymer latex, obtained by first polymerizing a portion of a monomer group consisting of acid-group containing monomer, alkyl acrylate and copolymerizable monovinyl monomer, which portion amounts to 5 to 90% by weight of the total amount of the monomer group and contains no said acid-group containing monomer, and then polymerizing the remaining 95 to 10% by weight portion of the monomer group which contains said acid-group containing monomer, has also an excellent agglomerating ability and can be used effectively.

In practicing the present invention, the above-mentioned acid-group containing copolymer (B) is used in the form of a latex. The agglomerating ability of the copolymer is markedly affected by the particle size of the latex. Latices having an average particle diameter in the range of 0.05 to 0.2 μm are preferably be used. When the average diameter is smaller than 0.05 μm the agglomerating ability of the copolymer is markedly decreased, whereas when it is larger than 0.2 μm the rubber particle diameter after agglomeration becomes too large, so that the system becomes unstable and is liable to coagulate when, for example, the system is subsequently subjected to graft polymerization. The particle diameters of the rubber of agglomerated particles obtained by the above-mentioned method are 0.2 to 1 μm.

Agglomeration of the synthetic rubber can be accomplished by adding the acid-group containing copolymer (B) in the form of a latex to the synthetic rubber latex.

The amount of the acid-group containing copolymer (B) latex to be added is 0.1 to 5 parts by weight, preferably 0.5 to 3 parts by weight, (in terms of solid) per 100 parts by weight (in terms of solid) of the synthetic rubber latex.

Further, inorganic electrolytes may simultaneously added on this occasion, whereby the particles of the synthetic rubber are agglomerated very effectively and stably. An amount of 0.05 to 4 parts by weight, preferably 0.1 to 1 part by weight of the inorganic electrolyte added to 100 parts by weight (in terms of solid) of the synthetic rubber (A) latex is sufficient to give good results. Particle-agglomeration of the synthetic rubber can be effectively performed by addition of such a small amount of the inorganic electrolyte.

Neutral inorganic salts such as potassium chloride, sodium chloride and sodium sulfate may be favorably used as the inorganic electrolytes.

It is also possible to add the inorganic electrolyte in advance at the time of the preparation of the synthetic rubber latex. It gives an effect equivalent to that of adding the electrolyte at the time of agglomerating treatment.

In practicing the agglomerating treatment of the present invention, it is necessary to keep the pH of the synthetic rubber (A) latex at 7 or above. When the pH value is on the acid side only a low agglomeration efficiency is exhibited by addition of the acid-group containing copolymer (B) latex and it is impossible to prepare advantageously the thermoplastic resin aimed at by this invention.

The adjustment of pH of the synthetic rubber (A) latex to 7 or above may be conducted either during the polymerization of the synthetic rubber or separately before the agglomerating treatment.

The graft copolymer (I) having excellent impact strength to be used in this invention can be obtained by polymerizing 93 to 30 parts by weight of a monomer or a monomer mixture for grafting comprising 30 to 100% by weight of at least one monomer selected from the group consisting of styrene, α-methylstyrene, acrylonitrile and methyl methacrylate and 0 to 70% by weight of at least one copolymerizable monomer having $CH_2=C<$ group in the presence of 7 to 70 parts by weight (in terms of solid) of the rubber latex of agglomerated particles resulting from the above agglomerating treatment.

Styrene, α-methylstyrene, acrylonitrile and methyl methacrylate which are used as the monomer for grafting are used each alone or in a mixture thereof as required. They are used in the range of 30 to 100% by weight in the whole monomer or monomer mixture for grafting.

Examples of the monomers having $CH_2=C<$ group and copolymerizable with the above monomers include aromatic vinyl compounds such as styrene, α-methylstyrene and vinyl toluene; vinyl cyanide compounds such as acrylonitrile and methacrylonitrile; and alkyl(meth)acrylates having 1 to 12 carbon atoms in the alkyl group. They are used each alone or in a mixture thereof. The amount to be used is not more than 70% by weight of the whole monomer mixture for grafting. To use them singly as grafting monomer is unfavorable.

Monomer mixtures for grafting include, for example, styrene-acrylonitrile mixtures, styrenealkyl acrylate mixtures, acrylonitrile-methyl methylacrylate mixtures, acrylonitrile-α-methylstyrene mixtures, methyl methacrylate-alkyl acrylate mixtures, and acrylonitrile-alkyl acrylate mixtures. Further, mixtures of three or more of these monomers, such as styrene-α-methylstyrene-acrylonitrile mixtures, may also be used.

Commonly known emulsifiers and catalysts are used in the above emulsion graft polymerization with no particular restriction imposed as to the kind and amount to be added thereof.

In graft-polymerizing a monomer onto the rubber of agglomerated particles, the monomer to be grafted may be added all at once, or in portions, or continuously. The monomers may also be graft-polymerized individually and stepwise.

As to the monomers having $CH_2=C<$ group and copolymerizable with α-methylstyrene which are used in polymerization of the thermoplastic resin (II) having α-methylstyrene as its essential constituent, there may be mentioned vinyl cyanide compounds such as acrylonitrile and methacrylonitrile; aromatic vinyl compounds such as styrene and vinyltoluene; alkyl(meth)acrylates having 1 to 12 carbon atoms in the alkyl group; maleic anhydride, maleimide, N-alkylmaleimide and N-phenylmaleimide. These monomers are used each alone or in a mixture thereof.

There is no particular limitation as to the method of polymerization, but emulsion or mass polymerization is preferred. The proportion of α-methylstyrene constituting the thermoplastic resin (II) is preferably 30 to 90% by weight. A typical example of preferred thermoplastic resin (II) is α-methylstyreneacrylonitrile copolymer.

Examples of other thermoplastic resin (III) containing no α-methylstyrene unit include polystyrene, styrene-acrylonitrile copolymer, styrene-maleic anhydride copolymer, styrene-maleimide copolymer, styrene-N-phenylmaleimide copolymer, styrene-N-alkylmaleimide copolymer, styrenemethyl methacrylate copolymer, polymethyl methacrylate, polyvinyl chloride and polycarbonate. Styrene-acrylonitrile copolymer may be recommended as a preferred one.

The objective thermoplastic resin composition having excellent impact resistance as well as high heat resistance can be obtained by compounding 5 to 95% by weight of the graft polymer (I) thus obtained, 95 to 5% by weight of a thermoplastic resin (II) having α-methylstyrene as its essential constituent and 0 to 50% by weight of other thermoplastic resin (III) containing no α-methylstyrene unit in such a way that the proportion of said butadiene rubber (A) and that of the α-methylstyrene unit in the whole composition may be 3 to 40% by weight and 10 to 75% by weight, respectively. More preferably, the proportion of the butadiene rubber (A) and that of the α-methylstyrene unit in the whole composition are 10 to 30% by weight and 14 to 70% by weight, respectively.

When the content of the butadiene rubber of agglomerated particles in the thermoplastic resin composition of this invention is less than 3% by weight the composition is of no practical value because of its poor impact resistance. A content exceeding 40% by weight is unfavorable because the composition then has poor fluidity and processability.

When the content of the α-methylstyrene unit in the thermoplastic resin composition of this invention is less than 10% by weight, improvement in heat resistance is not manifested. When the content exceeds 75% by weight, impact strength of the resin composition is decreased. These are both unfavorable.

The graft polymer (I) mentioned above to be used in preparing the resin composition is not limited to single kind of polymer. It is possible to use a mixture of two or more kinds of graft copolymers obtained by methods which fall within the scope of above description.

In compounding the graft copolymer (I) and the thermoplastic resin (II) and optionally the thermoplastic resin (III) according to this invention, it is possible to compound the two in emulsion state when the thermoplastic resin (II) or (III) is prepared by emulsion polymerization. In other cases they are blended and compounded by means of various machines such as Henschel mixer, extruder, Banbury mixer or heating rolls depending on the combination of the state of the components, such as powder-powder or powder-beads combination.

The resin composition of this invention may be, as required, incorporated with antioxidants, lubricants, colorants, fillers and the like.

EXAMPLE

This invention will be illustrated in more detail below with reference to Examples.

The terms "part" and "%" as used in the following Examples refer to "part by weight" and "% by weight", respectively.

Physical properties of the composition were evaluated by the following method.

Impact strength: Izod impact strength (according to ASTM D 256)

Melt index: According to ASTM D 1238 (200° C., 5 kg load)

Vicat softening temperature: according to ISO R-306

EXAMPLE 1

| Synthesis of base rubber (A-1) | |
| --- | --- |
| 1,3-Butadiene | 66 parts |
| Butyl acrylate | 9 parts |
| Styrene | 25 parts |
| Diisopropylbenzene hydroperoxide | 0.2 part |
| Potassium oleate | 1.0 part |
| Potassium rosinate | 1.0 part |
| Sodium pyrophosphate | 0.5 part |
| Ferrous sulfate | 0.005 part |
| Dextrose | 0.3 part |
| Water | 200 parts |

Polymerization was carried out in a 100 liters autoclave at 50° C. according to the above recipe. Polymerization was nearly completed in 9 hours, yielding a rubber latex of conversion of 97%, particle diameter of 0.08 μm and pH of 9.

| Synthesis of acid-group containing copolymer (B-1) latex for agglomerating treatment | |
| --- | --- |
| n-Butyl acrylate | 85 parts |
| Methacrylic acid | 15 parts |
| Potassium oleate | 2 parts |
| Sodium dioctylsulfosuccinate | 1 part |
| Cumene hydroperoxide | 0.4 part |
| Formaldehyde sodium sulfoxylate | 0.3 part |
| Water | 200 parts |

Polymerization was carried out in a separate polymerization apparatus at 70° C. for 4 hours according to the above recipe. A latex of pH of 6.1 and average particle diameter of 0.08 μm was obtained at a conversion of 98%.

Preparation of rubber latex of agglomerated particles.

To 100 parts (in terms of solid) of the base rubber latex (A-1), were added in 5 seconds with stirring 1.5 parts (in terms of solid) of the (B-1) latex and 0.4 part of an inorganic electrolyte, $Na_2SO_4$. Stirring was continued for 30 minutes to obtain an agglomerated rubber latex having an average particle diameter of 0.32 μm.

Immediately thereafter, graft polymerization was carried out according to the following recipe by using the agglomerated rubber latex obtained above, to synthesize a graft copolymer.

| Synthesis of graft copolymer (G-1) | |
|---|---|
| Agglomerated rubber latex (as solid) | 60 parts |
| Styrene | 28 parts |
| Acrylonitrile | 12 parts |
| Cumene hydroperoxide | 0.16 part |
| Formaldehyde sodium sulfoxylate | 0.1 part |
| Potassium oleate | 1.0 part |
| Water | 200 parts |
| (Polymerization condition: 70° C., 4 hours) | |

The polymer latex obtained above was incorporated with 2 parts of butylated hydroxytoluene and 0.5 part of dilauryl thiopropionate as antioxidants, coagulated with 5% aqueous sulfuric acid, washed and dried to obtain white powders.

Evaluation of physical properties of final composition:

Thirty-three parts of the above-mentioned graft copolymer (G-1) was blended with 67 parts of a thermoplastic resin powder which had been separately prepared by emulsion polymerization using a monomer mixture of acrylonitrile-methylstyrene (30/70 by weight) so as to give a content of butadiene rubber and of α-methylstyrene in the whole resin composition of 20% and 47%, respectively. The resultant mixture was pelletized by means of an extruder. Test pieces of various kinds were prepared from the pellets by injection molding and their physical properties were evaluated. The results obtained are shown in Table 1.

COMPARATIVE EXAMPLE 1

The rubber (A-1) was used as it was without receiving the agglomerating treatment to be subjected to graft polymerization according to the recipe for above-mentioned (G-1) copolymer. A resin composition similar to that in Example 1 was prepared by using the graft copolymer thus obtained and the physical properties were simularly evaluated. The results obtained are shown together in Table 1.

COMPARATIVE EXAMPLE 2

| Synthesis of base rubber latex (A-2) | |
|---|---|
| 1,3-Butadiene | 66 parts |
| Butyl acrylate | 9 parts |
| Styrene | 25 parts |
| Potassium persulfate | 0.3 part |
| Dodecyl mercaptan | 0.4 part |
| Potassium oleate | 0.5 part |
| Potassium salt of disproportionated rosin acid | 0.5 part |
| Water | 50 parts |

A mixture of the above composition was charged into a 100 liters autoclave and polymerization was initiated at 60° C. with stirring at 80 r.p.m. When the conversion in polymerization reached 30% the number of revolution in stirring was changed to 140 r.p.m. and when it exceeded 50% the number of revolution was reduced to 100 r.p.m. Then an aqueous solution comprising 1.0 part of potassium oleate, 1.0 part of potassium salt of disproportionated rosin acid and 15 parts of water was added intermittently to the polymerization system. The polymerization was nearly completed in 45 hours, yielding a rubber latex of conversion of 97.5%, particle diameter of 0.28 μm and pH of 8.9.

The rubber latex was subjected to graft polymerization according to the above-mentioned recipe for (G-1) copolymer without receiving agglomerating treatment. A resin composition similar to that in Example 1 was prepared by using the graft copolymer thus obtained and the physical properties were evaluated in a similar manner. The results obtained are shown together in Table 1.

TABLE 1

| | Rubber particle diameter (μm) | Impact strength (kg · cm/cm) | Melt index (g/10 min.) | Vicat softening temp. (°C.) |
|---|---|---|---|---|
| Example 1 | 0.32 | 28.1 | 0.30 | 116 |
| Comparative Example 1 | 0.08 | 1.6 | 0.15 | 115 |
| Comparative Example 2 | 0.28 | 15.2 | 0.28 | 115 |

As is apparent from Table 1, a resin composition which can manifest a better impact strength with equivalent heat resistance is obtained by blending a rubber whose particles have been agglomerated by treating with an acid-group containing copolymer latex with a thermoplastic resin having α-methylstyrene as the essential constituent.

EXAMPLES 2 to 4

Various synthetic rubber latices (particle diameter: 0.06 to 0.1 μm) were subjected to agglomerating treatment in the coexistence of an electrolyte, $Na_2SO_4$, by adding the latex (B-1) for agglomerating treatment used in Example 1 in respective amounts indicated in Table 2 to 100 parts (in terms of solid) of the base rubber. The monomers indicated in Table 2 were subjected to graft polymerization in the presence of 45 parts of the agglomerated rubbers obtained above to give graft copolymers (G-2, G-3 and G-4).

The graft copolymers were each used to be blended in the same manner as in Example 1 to give resin compositions each having a content of the butadiene rubber and of the α-methylstyrene unit in the whole resin composition of 15% and 47%, respectively. The resin compositions were evaluated in the same manner as mentioned before. The results obtained are shown in Table 2.

TABLE 2

|  | Base rubber composition | pH of rubber latex | Amount of (B-1) latex added (as solid) (part) | Graft monomer composition | Impact strength (kg · cm/cm) | Vicat softening temp. (°C.) |
|---|---|---|---|---|---|---|
| Example 2 | Polybutadiene | 8.4 | 1.5 | AN/St = 30/70 (%) | 22.4 | 116 |
| Example 3 | Bd/MMA = 80/20 (%) | 9.0 | 1.5 | MMA/St = 80/20 (%) | 7.9 | 115 |
| Example 4 | Bd/AN = 75/25 (%) | 8.4 | 2.0 | AN/MA = 80/20 (%) | 10.6 | 112 |

Note: The abbreviations used in Table 2 have the following meanings.
Bd: Butadiene
MMA: Methyl methacrylate
AN: Acrylonitrile
St: Styrene
MA: Methyl acrylate

EXAMPLE 5

Graft polymerization was conducted according to the recipe shown below by using the agglomerated rubber latex obtained in Example 1 to synthesize a graft copolymer (G-5).

| Synthesis of graft copolymer (G-5) | |
|---|---|
| Agglomerated rubber latex (as solid) | 40 parts |
| Styrene | 22 parts |
| Acrylonitrile | 20 parts |
| α-Methylstyrene | 18 parts |
| Cumene hydroperoxide | 0.24 part |
| Formaldehyde sodium sulfoxylate | 0.15 part |
| Potassium oleate | 1.3 parts |
| Water | 200 parts |
| (Polymerization conditions: 70° C., 6 hours) | |

Thirty-eight parts of the graft copolymer (G-5) and 62 parts of the thermoplastic resin powder having α-methylstyrene as the essential constituent used in Example 1 were blended with each other to give a content of the butadiene rubber and of α-methylstyrene unit in the whole composition of 15% and 50%, respectively. The resultant mixture was pelletized by means of an extruder. Test pieces of various kinds were prepared from the pellets by injection molding and their physical properties were evaluated. The results obtained are shown in Table 3.

EXAMPLE 6

Graft polymerizations were conducted according to the recipe shown below by using the agglomerated rubber latex obtained in Example 1 to synthesize graft copolymers (G-6) and (G-7), respectively.

| Synthesis of graft copolymer (G-6) | |
|---|---|
| Agglomerated rubber latex (as solid) | 20 parts |
| Styrene | 57 parts |
| Acrylonitrile | 23 parts |
| Cumene hydroperoxide | 0.32 part |
| Formaldehyde sodium sulfoxylate | 0.2 part |
| Potassium oleate | 2.0 parts |
| Water | 200 parts |
| (Polymerization conditions: 70° C., 6 hours) | |
| Synthesis of graft copolymer | |
| Agglomerated rubber latex (as solid) | 15 parts |
| Styrene | 9 parts |
| Acrylonitrile | 25 parts |
| α-Methylstyrene | 51 parts |
| Cumene hydroperoxide | 0.45 part |
| Formaldehyde sodium sulfoxylate | 0.28 part |
| Potassium oleate | 2.8 parts |
| Water | 200 parts |
| (Polymerization conditions: 70° C., 8 hours) | |

Sixty parts (in terms of solid) of the graft polymer (G-6) mentioned above and 20 parts by weight (in terms of solid) of the graft polymer (G-7) were blended with each other in the form of a latex. The resultant mixture was incorporated with 2 parts of butylated hyroxytoluene and 0.5 part of dilauryl thiopropionate as antioxidants, coagulated with 5% aqueous sulfuric acid, washed and then dried to obtain white powders. Then, 80 parts of the pulverous mixture of the graft copolymers obtained above and 20 parts of a thermoplastic resin powder prepared separately by emulsion polymerization using a monomer mixture of acrylonitrile/styrene/α-methylstyrene of a ratio of 22/28/50 (in %) were blended with each other to give a content of the butadiene rubber and of α-methylstyrene unit in the whole resin composition of 15% and 20%, respectively. The blended product was formed into pellets by means of an extruder. Test pieces of various kinds were prepared from the pellets by injection molding and their physical properties were evaluated. The results are shown in Table 3.

EXAMPLE 7

Fifty parts of the graft copolymer (G-5) obtained in Example 5 and 50 parts of a thermoplastic resin powder prepared separately by mass polymerization using a monomer mixture of α-methylstyrene/methyl methacrylate/styrene/maleic anhydride of a ratio of 20/40/20/20 (in %) were blended with each other to give a content of the butadiene rubber and of α-methylstyrene unit in the whole composition of 20% and 19%, respectively. The blended product was formed into pellets by means of an extruder. Test pieces of various kinds were prepared from the pellets by injection molding and their physical properties were evaluated. The results obtained are shown in Table 3.

TABLE 3

|  | Impact strength (kg · cm/cm) | Vicat softening temperature (°C.) | Melt index (g/10 min.) |
|---|---|---|---|
| Example 5 | 18.0 | 117 | 0.29 |
| Example 6 | 22.9 | 102 | 1.50 |
| Example 7 | 7.4 | 120 | 0.18 |

EXAMPLES 8 TO 10

| Synthesis of acid-group containing copolymer (B-2) latex for agglomeration treatment | |
|---|---|
| n-Butyl acrylate | 25 parts |
| Potassium oleate | 2 parts |
| Sodium dioctylsulfosuccinate | 1 parts |
| Cumene hydroperoxide | 0.1 part |
| Formaldehyde sodium sulfoxylate | 0.3 part |
| Water | 200 parts |

A mixture having above composition was polymerized at 70° C. for 1.5 hours. Subsequently, a mixture comprising:

| n-Butyl acrylate | 60 parts |
|---|---|
| Methacrylic acid | 15 parts |
| Cumene hydroperoxide | 0.3 part | was added dropwise to the polymerized mixture at 70° C. over a period of 1 hour. Stirring was further continued for 1 hour to obtain a copolymer latex of conversion of 98% and average particle diameter of 0.08 µm.

To 100 parts (in terms of solid) of the base rubber (A-1) latex used in Example 1, were added 1.5 parts (in terms of solid) of the above-mentioned acid-group containing copolymer (B-2) latex and 0.4 part of $Na_2SO_4$, an inorganic electrolyte, in 5 seconds with stirring. The resultant mixture was stirred further for 30 minutes to give an agglomerated rubber latex having an average diameter of 0.36 µm.

Resin compositions corresponding respectively to graft polymers G-8, G-9 and G-10 as well as the above-mentiond graft copolymer were prepared in the same manner as in Examples 1, 5 and 7 except that the agglomerated rubber latex obtained above was used, and their physical properties were evaluated. The results obtained are shown in Table 4.

TABLE 4

| | Impact strength (kg · cm/cm) | Vicat softening temperature (°C.) | Melt index (g/10 min.) |
|---|---|---|---|
| Example 8 | 30.4 | 116 | 0.31 |
| Example 9 | 20.1 | 117 | 0.30 |
| Example 10 | 9.5 | 120 | 0.20 |

EXAMPLES 11 TO 14

A graft copolymer was prepared according to the recipe shown below by using the agglomerated rubber latex used in Example 1.

| Synthesis of graft copolymer (G-11) | |
|---|---|
| Agglomerated rubber latex (as solid) | 50 parts |
| Styrene | 21 parts |
| Acrylonitrile | 9 parts |
| Cumene hydroperoxide | 0.15 part |
| t-Dodecyl mercaptan | 0.24 part |
| Potassium salt of disproportionated rosin acid | 1.0 part |
| Dextrose | 0.4 part |
| Ferrous sulfate | 0.01 part |
| Sodium pyrophosphate | 0.2 part |
| Water | 200 parts |

A mixture having the above composition was polymerized at 70° C. for 1 hour. Subsequently a mixture comprising:

| α-Methylstyrene | 14 parts |
|---|---|
| Acrylonitrile | 6 parts |
| Cumene hydroperoxide | 0.15 part |
| t-Dodecyl mercaptan | 0.24 part | was added dropwise to the polymerized mixture at 70° C. over a period of 30 minutes, and the resultant mixture was stirred for further 2 hours to give a graft polymer.

The polymer latex thus obtained was incorporated with 2 parts of butylated hydroxytoluene and 0.5 part of dilauryl thiopropionate as antioxidants, coagulated with 5% aqueous sulfuric acid, washed and dried to obtain white powders.

Evaluation of physical properties of final composition

The above-mentioned graft copolymer (G-11), a thermoplastic resin (II) containing α-methylstyrene unit separately prepared by emulsion polymerization using a monomer mixture of acrylonitrile/α-methylstyrene of a ratio of 25/75 (in %), and a thermoplastic resin (III) containing no α-methylstyrene unit prepared by suspension polymerization using a monomer mixture of acrylonitrile/styrene of a ratio of 30/70 (in %) were blended with one another according to the composition shown in Table 5. The belnded product was pelletized by means of an extruder. Test pieces of various kinds were prepared from the pellets by injection molding and their physical properties were evaluated. The results obtained are shown in Table 5.

TABLE 5

| | Example 11 | Example 12 | Example 13 | Example 14 |
|---|---|---|---|---|
| Graft copolymer (G-11) | 30 | 30 | 30 | 30 |
| Acrylonitrile-α-methylstyrene copolymer (25/75) | 70 | 60 | 50 | 30 |
| Acrylonitrile-styrene copolymer (30/70) | 0 | 10 | 20 | 40 |
| Rubber content in whole composition | 15 | 15 | 15 | 15 |
| α-Methylstyrene content in whole composition | 60 | 49 | 42 | 27 |
| Izod impact strength (kg · cm/cm) | 18.1 | 21.4 | 22.2 | 23.1 |
| Vicat softening temperature (°C.) | 121 | 117 | 113 | 109 |
| Melt index (g/10 min.) | 0.31 | 0.37 | 0.51 | 0.69 |

EFFECT OF THE INVENTION

A thermoplastic resin composition having extremely high impact strength as well as excellent heat resistance which have not been attained by prior arts can be obtained by using a synthetic rubber latex of a large particle size agglomerated by treating witn an acid-group containing copolymer latex.

What is claimed is:

1. A thermoplastic resin composition having excellent impact resistance and heat resistance which comprises 5 to 95% by weight of a graft copolymer (I) obtained by polymerizing 93 to 30 parts by weight of a monomer or a monomer mixture for grafting comprising 30 to 100% by weight of at least one monomer selected from the group consisting of styrene, α-methylstyrene, acrylonitrile and methyl methacrylate and 0 to 70% by weight of at least one copolymerizable monomer having a $CH_2=C<$ group in the presence of 7 to 70 parts by weight (in terms of solid) of a rubber latex of agglomerated particles having a particle diameter of at least 0.2 μm obtained by adding 0.1 to 5 parts by weight (in terms of solid) of an acid-group containing copolymer (B) latex obtained from 3 to 30% by weight of an acid-group containing monomer, 97 to 35% by weight of at least one alkyl acrylate having 1 to 12 carbon atoms in the alkyl group, and 0 to 48% by weight of at least one monovinyl monomer copolymerizable therewith (100% by weight in total) to 100 parts by weight (in terms of solid) of a rubber (A) latex of small particle size having a pH of 7 or above obtained from 100 to 50% by weight of 1,3butadiene and 0 to 50% by weight of other copolymerizable monomer having a $CH_2=C<$ group (100% by weight in total); 95 to 5% by weight of a thermoplastic resin (II) obtained by polymerizing α-methylstyrene and at least one of other copolymerizable monomer having $CH_2=C<$ group; and 0 to 50% by weight of another thermoplastic resin (III) containing no α-methylstyrene unit, said components (I), (II) and (III) being compounded so as to give a content of said butadiene rubber (A) in the whole composition of 3 to 40% by weight and a content of α-methyltyrene unit in the whole composition of 10 to 75% by weight.

2. The thermoplastic resin composition according to claim 1 wherein the rubber (A) of small particle size is polybutadiene.

3. The thermoplastic resin composition according to claim 1 wherein the average particle diameter of the rubber (A) of small particle size is 0.04 to 0.2 μm.

4. The thermoplastic resin composition according to claim 1 wherein the acid-group containing monomer used in synthesizing the acid-group containing copolymer (B) is at least one monomer selected from the group consisting of acrylic acid, methacrylic acid, itaconic acid and crotonic acid.

5. The thermoplastic resin composition according to claim 1 wherein the acid-group containing copolymer (B) is n-butyl acrylate-methacrylic acid copolymer.

6. The thermoplastic resin composition according to claim 1 wherein the acid-group containing copolymer (B) is one which is obtained by first polymerizing a portion of a monomer group consisting of acid-group containing monomer, alkyl acrylate and copolymerizable monovinyl monomer, which proportion amounts to 5 to 90% by weight of the total amount of the monomer group and contains no said acid-group containing monomer, and then polymerizing the remaining 95 to 10% by weight portion of the monomer group which contains the acid-group containing monomer.

7. The thermoplastic resin composition according to claim 1 wherein 0.05 to 4 parts by weight of an inorganic electrolyte is further added to 100 parts by weight (in terms of solid) of the rubber (A) latex of small particle size.

8. The thermoplastic resin composition according to claim 1 wherein the monomer mixture for grafting is a mixture of styrene and acrylonitrile.

9. The thermoplastic resin composition according to claim 1 wherein the monomer mixture for grafting is a mixture of styrene, α-methylstyrene and acrylonitrile.

10. The thermoplastic resin composition according to claim 1 wherein the monomer mixture for grafting is a mixture of α-methylstyrene and acrylonitrile.

11. The thermoplastic resin composition according to claim 1 wherein the content of the α-methylstyrene unit in the thermoplastic resin (II) is 30 to 90% by weight.

12. The thermoplastic resin composition according to claim 1 wherein the thermoplastic resin (II) is α-methylstyrene-acrylonitrile copolymer.

13. The thermoplastic resin composition according to claim 1 wherein the thermoplastic resin (II) is styrene-acrylonitrile copolymer.

* * * * *